United States Patent [19]
Busch

[11] 3,872,723
[45] Mar. 25, 1975

[54] METHOD AND APPARATUS FOR MEASURING THE AVERAGE LIQUID FLOW OF A RECIPROCATORY PUMP

[75] Inventor: Ulrich Busch, Karlsruhe, Germany
[73] Assignee: Hewlett-Packard GmbH, Boblingen, Germany
[22] Filed: Dec. 19, 1973
[21] Appl. No.: 426,416
[30] Foreign Application Priority Data
Dec. 28, 1972 Germany..................2263768
[52] U.S. Cl................................ 73/194 R, 73/199
[51] Int. Cl. ................................ G01f 13/00
[58] Field of Search.......... 73/194 R, 199, 198, 223, 73/206

[56] References Cited
UNITED STATES PATENTS
2,892,346   6/1959   Sargent ........................ 73/194 R
3,714,828   2/1973   Durkan ........................ 73/194 R Primary Examiner—James J. Gill
Assistant Examiner—Anthony V. Ciarlante
Attorney, Agent, or Firm—Stephen P. Fox

[57] ABSTRACT

A liquid storage means and a flow passage resistant means are connected between a reciprocatory pump and the input to a liquid chromatography system. The pressure variations caused by the pumping action induce proportional variations of the storage volume of the liquid storage means. These pressure variations are sensed and supplied to a signal processing means which includes a differentiating circuit. The movement of the plunger of the pump is scanned in order to derive timing signals related to a certain portion of the pump cycle. These timing signals control the signal processing means such that output signals are obtained which are related to the pressure drop of the liquid storage means during said portion of the pump cycle. The output signals are indicative of the average liquid flow being pumped.

12 Claims, 4 Drawing Figures $\frac{\Delta p}{p} \sim 1‰$ ns. 3,872,723

METHOD AND APPARATUS FOR MEASURING THE AVERAGE LIQUID FLOW OF A RECIPROCATORY PUMP

BACKGROUND OF THE INVENTION

In many applications, such as the chromatographic analysis of liquid, it is of particular importance that a liquid fed intermittently by a pump be transformed by means of suitable stabilizing members into an essentially continuous flow and that the flow be measured exactly. The stabilizing means used for this purpose consist of flow resistances and accumulators for the flowing agent, such as Bourden tubes, the volume of which varies in response to the pressure.

The flow rates concerned are in many cases relatively low, i.e., up to 10 ml/min, with pressures ranging from 0 to 300 atm. and must be measured with an accuracy of approximately 1 percent. This accuracy is of importance in gradient elution in which substances charged into a liquid chromatograph are solved and separated one by one, in a predetermined sequence. More particularly, the composition of a solvent flow is varied to increase the proportion of the solvent having the greater solving power with a corresponding reduction of the solvent having the lower solving power. This process requires an exact control of the flow rates of the two components.

Heretofore, a plurality of methods for measuring the flow rate of liquids have been known. However, they have proved unsatisfactory either because the properties of the liquid change (for instance by gas bubbles), or because the liquid is subject to local heat which is too rapidly drawn along with the flow, or because the methods cannot be applied under high pressures or with aggressive liquids.

SUMMARY OF THE INVENTION

The present invention provides a method and apparatus which allow the accurate measurement of the average liquid flow of a reciprocating pump in a simple manner. The measurement of flow rate, which heretofore has been very complex, has been simplified by using pressure variations, which heretofore have been considered as rather troublesome, as an indication of the mean flow rate.

According to the illustrated embodiment of the invention, there is provided a reciprocating pump which intermittently pumps a liquid, for use in gradient elution in liquid chromatography, for example. Connected to the pump is a means resistant to the passage of the liquid as well as a liquid storage means. The storage volume of the liquid storage means is varied substantially in proportion to the pressure applied to the storage means by the liquid being pumped. A time constant results from the product of (a) the resistance of the liquid passage resistant means, and (b) the capacitance of the liquid storage means as defined by the change in volume related to applied pressure. This time constant is greater than the cycling time of the reciprocating pump. A pressure measuring device measures variations in the pressure exerted on the liquid storage means during selected time intervals which are related to the pumping rhythm of the pump, and a signal is derived from said pressure variations which indicates the flow rate of the pumped liquid.

The invention provides the advantage that it operates essentially independently of the specific flow resistance of the particular liquid, which is determined primarily by the viscosity of the liquid.

In the preferred embodiment of the invention, the speed of the pressure drop is measured during a certain portion of the interval between the feeding strokes of the pump. During these intervals the pressure drop encountered is independent of the pump characteristics and follows an exponential function.

The signal representative of the pressure may be rectified and used as a standard for the mean value of the flow rate. The pressure variations may be used also to derive other signals significant of the flow rate of the liquid, such as the effective value.

The measurement of the flow rate may be carried out independently of the pressure if the liquid storage means takes the form of a diaphragm accumulator, in which the diaphragm separates a measuring chamber having inlets and outlets for the flowing liquid from a counter-pressure chamber, and in which the volume of the measuring chamber and its supply line does not differ substantially from zero unless subject to pressure.

In the chromatographic analysis of liquids, the rapid rinsing of the measuring chamber between two successive flowing liquids, is particularly desirable. This is possible with the illustrated embodiment of the present invention because the pressure-measuring device is connected to the counter-pressure chamber.

DETAILED DESCRIPTION OF THE PREFERRED EMBODIMENT

Figure 1:
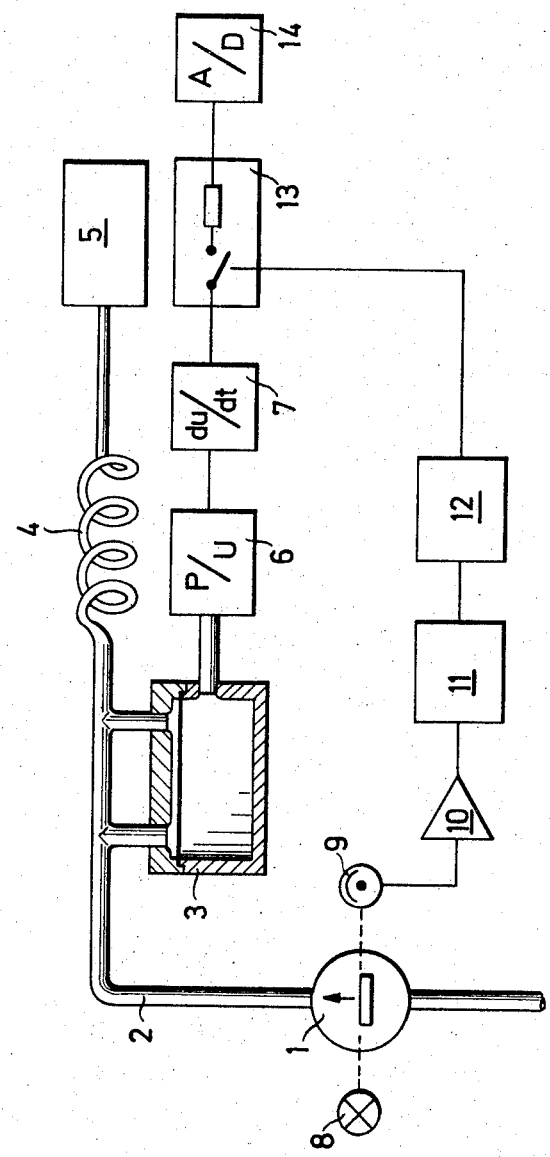
FIG. 1 is a diagrammatic representation of the preferred embodiment of the invention.

According to FIG. 1, a piston pump 1 is connected to a liquid chromatograph 5 via a line 2, an accumulator 3 and a flow resistance 4. A pressure-measuring device 6 is connected to a diaphragm accumulator 3 and sends voltage signals corresponding to the pressure variations in the accumulator generated by the flowing agent, e.g., a liquid, to a differentiating circuit 7.

The motion of the piston of pump 1 is scanned by means of a light source 8 and a photocell 9 so that an electric signal is produced each time the piston reaches a predetermined position. This signal is amplified by an amplifier 10, and thereafter delayed in an adjustable delay circuit 11 and transmitted to a pulse generator 12. The output of pulse generator 12 is a series of trigger pulses for a sample-and-hold circuit 13 whose output is connected to an analog-to-digital converter 14. The sample-and-hold circuit 13 is triggered in accordance with the pump rhythm in a manner that the voltage signals corresponding to the pressure variations in the accumulator 3 are transmitted to the analog-to-digital converter 14 only during a certain portion of the return interval or stroke between the feeding strokes of the pump. The output of the converter 14 represents the fluid flow rate.

The piston pump 1 feeds the liquid intermittently and may typically have the following characteristics:

| | |
|---|---|
| flow quantity: | 0 to 10 ml/min |
| duration of feeding stroke: | 250 ms |
| cycle time: | 600 ms |

Figures 2A, 2B:
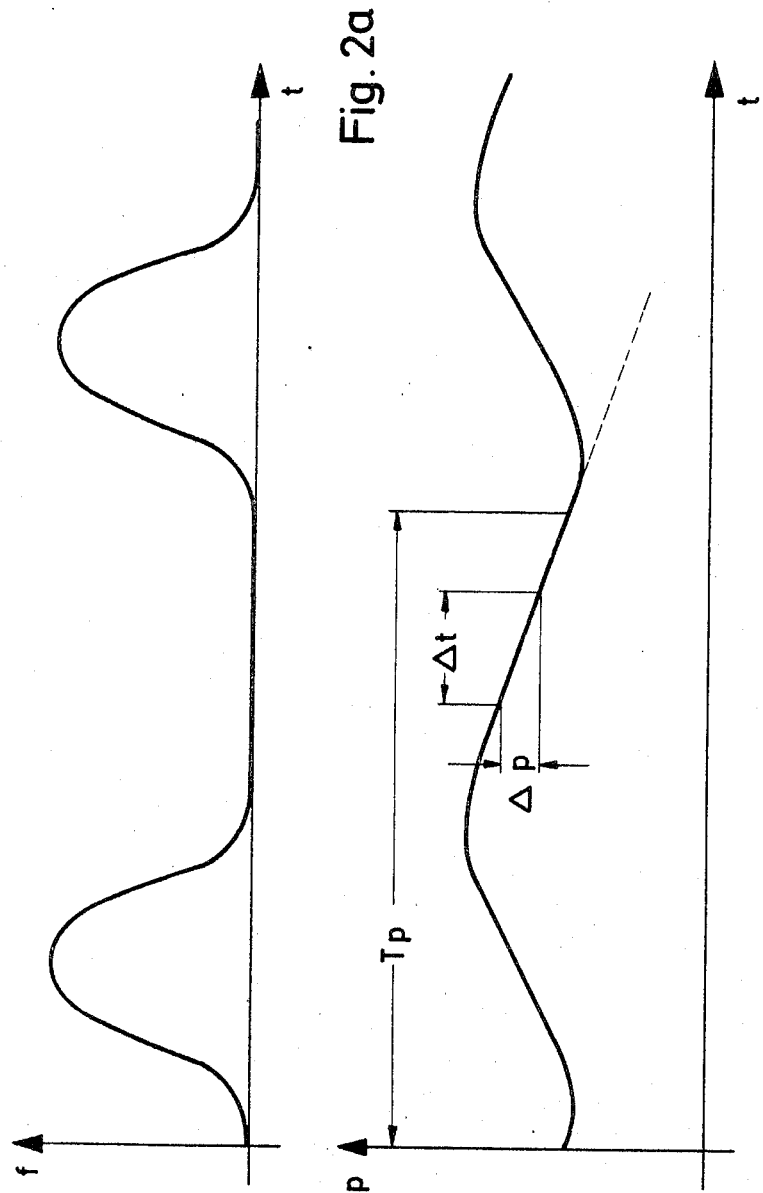
FIG. 2a is a qualitative representation of the sequence, as a function of time, of the flow fed by an intermittently operating pump.
FIG. 2b is a qualitative representation of the sequence, as a function of time, of the pressure variations in the accumulator.

As shown in FIG. 2a, the curve of the flow fed by the pump, as a function of time, is sine-shaped during the feeding strokes. However, if the desired measurements are carried out during the intervals between the feeding strokes of the pump, the pump characteristics will not influence the measuring process.

Line 2 has, for example, a cross-section of 0.07 mm² and is typically designed for a pressure of 500 atm. Conveniently, it is arranged to provide the shortest possible connection between the members to be connected so as to reduce the dead volume to the smallest possible value, preferably not in excess of 50 $\mu$l.

Figure 3:
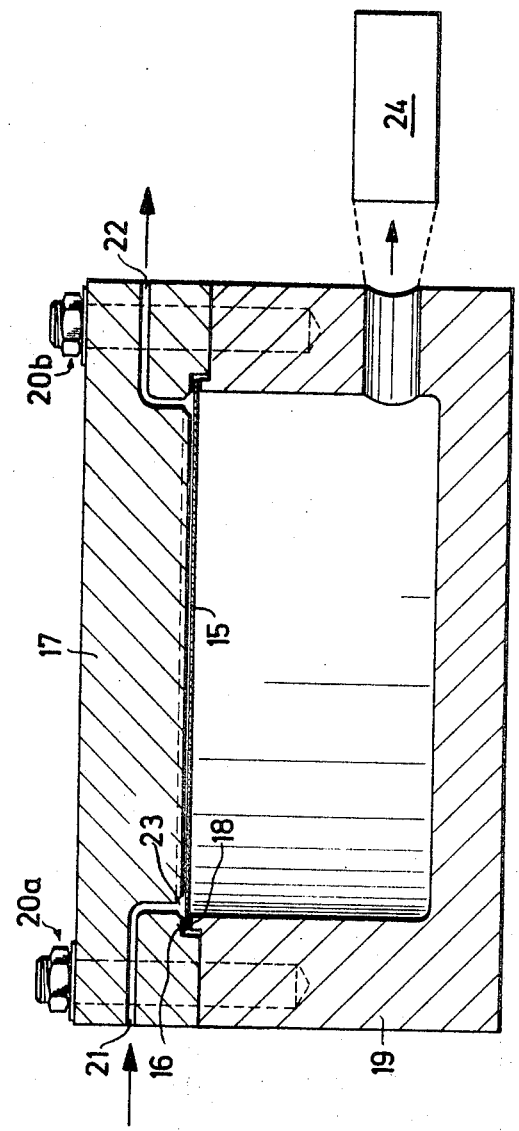
FIG. 3 is a cross-sectional view of a diaphragm accumulator for use in an apparatus according to the invention.

The accumulator 3 is preferably a diaphragm accumulator as diagrammatically shown, for instance, in FIG. 3. A circulator metal diaphragm 15 is fixed between an inner shoulder 16 of an upper cylinder half 17 and an outer shoulder 18 of a lower cylinder half 19, the two cylinder halves being screwed together by means of bolts 20a, b. Together with the upper cylinder half, the diaphragm forms a measuring chamber which communicates via inlets and outlets 21, 22 with the flowing agent, namely a liquid or a gas. In its pressureless phase, the said measuring chamber together with its inlet line has an extremely small (dead) volume of less than 200 $\mu$l and is connected to the inlets and outlets via an annular groove 23 extending about its periphery and immediately adjacent the shoulders 16, 18 of the two cylinder halves. As will be demonstrated hereafter, it is necessary that the dead volume be kept small to insure that the measurements are made with good approximation and independently of the compressibility of the flowing agent.

The volume of the measuring chamber has a capacitance C equal to the quotient of the volume variation $\Delta V$ relative to the pressure variation $\Delta P$, the said capacitance C having a constant known value for the pressures encountered and being essentially greater than the variable capacitance $\Delta C$ which depends on the compressibility of the flowing agent and the geometry of the feed lines. That is to say, a higher constant and known capacitance is connected in parallel to the variable unknown capacitance so that the variations in the value of the smaller capacitance may be neglected.

The annular groove provided in the measuring chamber offers the particular advantage to allow rapid rinsing between two successive flowing agents, a feature which is of particular importance in chromatography.

The diaphragm and the lower cylinder half 19 form together a counter-pressure chamber filled with a highly compressible liquid, such as hexane, and connected to a conventional pressure measuring device 24 which in turn converts the pressure variations encountered in this chamber into analog electric signals. Device 24 corresponds to device 6 in FIG. 1. The fact that the pressure measuring device is connected to the said counter-pressure chamber instead of the measuring chamber offers the particular advantage that the dead volume of the pressure measuring device does not result in an increase of the dead volume of the measuring chamber, which would increase the interdependence between the measuring accuracy and the compressibility of the flowing agent, as will be demonstrated hereafter by means of formulas.

The flow resistant means 4 is a portion of the line 2 reduced having cross-section and is preferably provided downstream of accumulator 3. The remaining components of the system of FIG. 1 are well known to one skilled in the art and need not be explained herein.

The resistance of accumulator 3 is essentially determined by the capacitance value C and the frequency of the pump. The suitable selection of the accumulator resistance in relation to the resistance value R of the reduced line portion 4 makes it possible to obtain a flow and/or pressure curve, as a function of time, as shown diagrammatically in FIG. 2b. However, such a curve will be obtained only provided that the product of R × C is higher than the cycle time of the pump.

It results from FIG. 2a, that during the feeding stroke of the pump, the flow follows a sine-shaped curve. FIG. 2b shows that the curve of the pressure in the accumulator 3 takes the form of a flattened sine function. Upon completion of the feeding stroke, during the return stroke, the pressure drops exponentially and with a certain delay in time. Shortly after the beginning of the next feeding stroke, the pressure rises again in the form of a flattened sine curve.

Considering that the time constant R × C is essentially higher than the cycle time T of the pump, the exponential pressure curve during the interval between feeding strokes may be replaced with good approximation by a tangent line to the beginning of the exponential function.

Mathematically, the measuring method of the present invention may be demonstrated as follows: The total change, at a pressure variation $\Delta P$, of the liquid quantity $\Delta V_F$ encountered in the feed line 2, flow resistance 4, and the measuring chamber of the accumulator is $$\frac{\Delta V_F}{\Delta P} = \left(\frac{\partial V}{\partial P}\right)_{V_F} + \frac{1}{\Delta V}\left(\frac{\partial V_F}{\partial P}\right)_V \left[V_L + \frac{\partial V}{\partial P}V_F \Delta P\right] \quad (1)$$

wherein the first term on the right-hand side of equation (1) represents the pressure-responsive geometrical change in the volume of the measuring chamber of the accumulator 3 which in turn represents the constant and known capacitance value C of the accumulator.

The second term of equation (1) comprises initially the formula for the pressure-responsive change in the liquid volume due to the compressibility of the fed liquid and represents the specific compressibility of the fed liquid. Other factors of the second term are again the pressure variation $\Delta P$ and the geometrical change in the volume of the measuring chamber.

The third term of equation (1) represents the contribution of the change in the liquid volume in the measuring chamber resulting from the compressibility of the liquid in the feed line 2, flow resistance 4 and the dead volume $V_L$ of the measuring chamber in its pressureless phase.

Using the above definitions of the capacitance value C and the compressibility, it results that:

$$\Delta V_F = C \cdot \Delta P + [V_L + C \cdot \Delta P] \cdot \Delta P \quad (2)$$

If the change in the liquid volume of the measuring chamber is to be obtained with good approximation (for example with an accuracy of 1 percent) independently of the compressibility of the specific liquid, the following formulas must hold:

$$C \cdot \Delta P \gg [V_L + C \cdot \Delta P] \cdot \Delta P \quad (3)$$

and/or $$C \gg [V_L + C \cdot \Delta P] \quad (4)$$

Now, it is assumed that the unbalanced equations (3) and (4) provide good approximation so that the change $\Delta V$ of the geometrical volume of the measuring chamber is equal to the change of the liquid volume encountered in the chamber, which depends from the capacitance value C and thus from the pressure variation $\Delta P$:

$$\Delta V = \Delta V_F = C \cdot \Delta P \quad (5)$$

Using the following equation for defining the flow rate:

$$f - \Delta V/\Delta t \quad (6)$$

we obtain $f = C \cdot \Delta P/\Delta t$ \quad (7)

which means that the flow rate $f$ obtained during the interval between the pump strokes is equal to the product of the capacitance value C of the accumulator and the speed of the pressure drop of the pump. If the flow rate is damped in a manner which renders the pressure variation $\Delta P$ essentially smaller than the absolute pressure P, equation (7) represents also a correspondingly good approximation for the mean flow rate of the pump.

It should be noted that the speed of the pressure drop is independent of the viscosity of the specific flowing agent. This is a significant advantage of the present measuring method.

Measuring accuracy may be improved by deriving the mean value of several pump strokes. The number of pump strokes may either be determined by an additional counter to be installed at the pump or else derived directly from the measuring signal.

I claim:

1. Apparatus for measuring the liquid flow rate pumped by a cyclically operable, reciprocating pump having feed and return strokes, especially for use with gradient elution by a liquid chromatographic device, said apparatus comprising: liquid storage means and liquid flow resistant means connected
   to the output of said pump,
   said liquid storage means having a volume substantially proportional to the pressure applied thereto by the liquid being pumped; and a capacitance C defined by the change in volume with said applied pressure;
   said liquid flow resistant means having a resistance R to the flow of liquid;
   wherein the RC time constant resulting from the product of said resistance and capacitance is greater than the cycle time of said reciprocating pump;
   means for sensing the variations in pressure exerted on said liquid storage means by the liquid being pumped;
   timing means for producing timing signals related to the return stroke of said reciprocating pump; and
   signal processing means responsive to the outputs of said sensing means and said timing means for producing a signal representative of said variations in pressure during at least a portion of the return stroke of said pump, said last named signal being indicative of the flow rate of the pumped liquid.

2. Apparatus as in claim 1, wherein the capacitance C of the liquid storage means as defined by the change in volume related to applied pressure is substantially constant over the range of the sensed pressure variations.

3. Apparatus as in claim 2, wherein the signal processing means includes a differentiating circuit coupled to the outputs of said pressure sensing means and said timing means, said differentiating circuit providing an output signal representative of the pressure variations related and synchronized to the return strokes of the pump.

4. Apparatus as in claim 1, wherein said liquid flow resistant means is connected to receive the liquid flow from the output of said liquid storage means.

5. Apparatus as in claim 1, wherein the liquid storage means, the liquid flow resistant means and the signal processing means are coupled between the pump and a liquid chromatographic device.

6. Apparatus as in claim 1, wherein the timing signals supplied by the timing means define a part of the time interval of the return stroke of the pump.

7. Apparatus as in claim 1, wherein the signal processing means includes sample-and-hold means for storing the values of several sequential pressure drops at the liquid storage means during sequential return strokes of the pump.

8. Apparatus as in claim 1, wherein the signal processing means includes means for rectifying the signals which correspond to the pressure variations at the liquid storage means, thereby to provide an output signal which is indicative of the average liquid flow rate.

9. Apparatus as in claim 1, wherein the liquid storage means comprises a device having a measuring chamber and a counter pressure chamber separated from the measuring chamber by a diaphragm, said measuring chamber having input and output channels for passing the liquid for which the flow rate is to be measured, the total volume of the measuring chamber and the input and output channels being substantially zero, except during application of pressure to the measuring chamber.

10. Apparatus as in claim 9, wherein the volume of the measuring chamber and the input and output channels in the non-pressured condition is substantially smaller than the quotient of the capacitance C of the liquid storage means and the compressibility factor of the liquid.

11. Apparatus as in claim 9, wherein the pressure sensing means is coupled to the counter pressure chamber.

12. Apparatus as in claim 9, wherein the measuring chamber contains a flat annular groove which extends circumferentially and in proximity to the edge of the diaphragm and which is connected to the input and output channels for the liquid being pumped.

* * * * *

UNITED STATES PATENT OFFICE
CERTIFICATE OF CORRECTION

Patent No. 3,872,723  Dated March 25, 1975

Inventor(s) Ulrich Busch

It is certified that error appears in the above-identified patent and that said Letters Patent are hereby corrected as shown below:

Column 1, line 17, "0 to 3.00 atm." should read -- 0 to 300 atm. --;

Column 4, line 40, that portion of equation (1) reading $$\left[ V_L + \frac{\partial V}{\partial P} V_F \Delta P \right]$$

should read --

$$\left[ V_L + \left(\frac{\partial V}{\partial P}\right)_{V_F} \Delta P \right]$$   --;

line 51, after "specific compressibility" insert -- $\varkappa$ --;
line 62, after "compressibility" and before the comma insert -- $\varkappa$ --; line 63, equation (2) should appear as follows --

$$\Delta V_F = C \cdot \Delta P + \varkappa [V_L + C \cdot \Delta P] \cdot \Delta P$$   --;

Column 5, line 3, equation (3), after " >> " insert -- $\varkappa$ --; line 6, equation (4), after " >> " insert -- $\varkappa$ --; line 17, equation (6) should appear as follows --

$$f = \Delta V / \Delta t$$   --.

Signed and sealed this 1st day of July 1975.

(SEAL)
Attest:

RUTH C. MASON
Attesting Officer

C. MARSHALL DANN
Commissioner of Patents
and Trademarks